United States Patent
Canning

(10) Patent No.: US 10,329,029 B2
(45) Date of Patent: Jun. 25, 2019

(54) FALLING DRONE WARNING APPARATUSES AND METHODS

(71) Applicant: 1twoZ, LLC, Fairfield, OH (US)

(72) Inventor: Ryan Matthew Canning, Fairfield, OH (US)

(73) Assignee: 1twoZ, LLC, Fairfield, OH (US)

( * ) Notice: Subject to any disclaimer, the term of this patent is extended or adjusted under 35 U.S.C. 154(b) by 262 days.

(21) Appl. No.: 15/620,079

(22) Filed: Jun. 12, 2017

(65) Prior Publication Data

US 2017/0355469 A1    Dec. 14, 2017

Related U.S. Application Data

(60) Provisional application No. 62/349,079, filed on Jun. 12, 2016.

(51) Int. Cl.
   *B64D 45/00*    (2006.01)
   *G08G 5/00*    (2006.01)
   *G05D 1/12*    (2006.01)

(52) U.S. Cl.
   CPC ........ *B64D 45/00* (2013.01); *B64D 2045/008* (2013.01)

(58) Field of Classification Search
   CPC ............ B64D 45/00; G08G 5/00; G05D 1/12
   See application file for complete search history.

(56) References Cited

U.S. PATENT DOCUMENTS

| | | | |
|---|---|---|---|
| 4,086,589 A | 4/1978 | Cieslak | |
| 4,141,522 A * | 2/1979 | Lambregts | G05D 1/0676 244/186 |
| 6,471,160 B2 | 10/2002 | Grieser | |
| 6,685,140 B2 | 2/2004 | Carroll | |
| 6,825,777 B2 | 11/2004 | Vock | |
| 8,006,936 B1 | 8/2011 | Farr | |
| 8,979,023 B1 | 3/2015 | Wang | |
| 9,010,682 B2 | 4/2015 | Giovangrossi | |
| 9,216,818 B1 | 12/2015 | Wang | |
| 9,477,229 B1 | 10/2016 | Lee | |
| 9,493,250 B2 | 11/2016 | Wang | |
| 9,567,102 B1 | 2/2017 | Ross | |
| 9,613,539 B1 | 4/2017 | Lindskog | |
| 2013/0173092 A1 | 7/2013 | Chandran | |
| 2016/0001893 A1 | 1/2016 | Wang | |
| 2016/0075447 A1 | 3/2016 | Wang | |
| 2016/0284221 A1* | 9/2016 | Hinkle | G08G 5/0034 |

OTHER PUBLICATIONS

Mayday 2.0 Flowchart (dated Jan. 29, 2015), published at www.maydayboards.com/downloads.

* cited by examiner

*Primary Examiner* — Yuri Kan
(74) *Attorney, Agent, or Firm* — David A. Topmiller, Esq.

(57) ABSTRACT

Falling drone warning apparatuses and methods are disclosed. The apparatus may be attached to a drone and may measure acceleration during the drone's operation in order to ascertain whether the drone is free falling. If the apparatus detects that the drone is free falling, the apparatus may activate an audible alarm to warn people on the ground of the potential danger and to afford them the opportunity to take action to avoid the drone's impact or minimize its effect.

20 Claims, 3 Drawing Sheets

FALLING DRONE WARNING APPARATUSES AND METHODS

CROSS REFERENCE TO RELATED APPLICATION

This application claims the benefit of provisional application Ser. No. 62/349,079, filed Jun. 12, 2016, the disclosure of which is incorporated herein by reference.

TECHNICAL FIELD

The present disclosure generally relates to unmanned aerial vehicles, hereinafter referred to as "drones," and apparatuses and methods for warning people that a drone may be falling to the ground.

BACKGROUND

As background, drones are remotely operated aircraft which use wireless communications to an operator for command and control. Drones are also called "unmanned aircraft systems" or "unmanned aerial vehicles." Most drones feature geo-positioning using a global navigation satellite system (GNSS) such as the United States' global positioning satellite (GPS) system. Drones have been in use for over a century for military purposes, such as missile targets; yet their existence and usage were relatively unknown until America's war on terror following the Sep. 11, 2001, terrorist attacks. Shortly thereafter, the Predator® aircraft became a household name for its well-publicized missions in intelligence, surveillance, and reconnaissance (ISR) and for its use in remote missile attacks. However, only in the past five years or so have drones become ubiquitous, primarily with vertical-take-off-and-landing (VTOL) aircraft featuring multiple propellers (e.g., quadcopters, octocopters), such as the Phantom® from DJI®, but also with more traditional aircraft featuring a single propeller and forward flight. Aided greatly by several technological advances and economies of scale, consumer- and commercial-grade drones have become available at an affordable cost, enabling the adoption by law enforcement, various industries, educational institutions, hobbyists, and even household consumers.

Drones are now in use in industries as varied as law enforcement, emergency management, photography, videography, motion picture and television, real estate, farming and agriculture, construction, mining, sports, railroad, utilities, oil and gas, and so forth. The applications for drones continue to grow at a remarkable rate; and, thus, it is only time before their use and presence in our skies become widespread. With this advancement comes a growing safety threat, as these machines can suffer from unexpected catastrophic failures as well as "fly-aways" when the user loses complete control of the drone, and it travels out of visual range without warning. Several injuries have been reported as well as widely publicized near-misses. In one such example, a professional skier was nearly struck by a falling videography drone during a skiing event in December, 2015, in Italy. Other people have not been so lucky. In another example, an athlete was reportedly struck on the head by a drone in April, 2014, during a triathlon in Western Australia. It is very likely that accident rates will rise as more and more people begin flying drones.

While drone manufacturers are beginning to build in safety features, such as proximity sensors to help prevent crashing into objects and geo-fencing to prevent drone usage in certain geographical areas or airspace (e.g., the White House in Washington, D.C.), they may fall short of mitigating the threat of catastrophic failure in which either the electronics and/or the battery stops working and the drone falls victim to gravity.

Existing add-on drone safety devices on the market are currently limited to automatic parachutes, which while novel and promising for reducing the risk of serious injury, are much heavier solutions and do not warn people on the ground of the impending impact. Thus, there exists a void in the market for a compact electronic device that intelligently senses a drone's flight status and provides advance warning to those on the ground if there is a catastrophic failure. Such a device must be small and light enough to attach to a drone without significantly impacting the drone's battery life or aerodynamics. The present disclosure is directed toward providing such apparatuses and methods.

The apparatuses and methods disclosed herein may significantly reduce the risk of innocent bystanders (i.e., people and animals) being unaware of an impending crash from a drone falling from the sky. The apparatuses may feature three-axis sensing of acceleration as well as other sensor inputs to determine if a drone is in free-fall. The apparatuses may further include a loud audible alarm which is intended to immediately direct one's attention to the sky, similar to the effect of an ambulance or police siren since the natural reaction is to look in the direction of audible alarm like a siren. The audible alarm may be augmented by an optional visual alarm to visually cue bystanders to look up in the sky and take immediate action, such as to run or dive out of the way of the falling object. The visual alarm would add the ability for individuals to visually identify the current position and trajectory of the falling drone, especially in low-light conditions. Further, this apparatus may operate completely independently from the drone, except for the physical attachment. Thus, the apparatus may not derive power or sensor inputs directly from the drone, which may provide an inherent redundancy to any native safety features provided by the drone itself.

As such, the present disclosure describes a warning apparatus which may operate independently from the drone, including sensing and characterizing the drone's flight status and providing its own power. Such a warning apparatus may provide advance warning to people on the ground of a potential impact from a falling drone and may afford them the ability to vacate the area of imminent impact or at least to mitigate the damage of the impact by protecting the head and/or neck area. Furthermore, the warning apparatus may be expected to minimize injuries and possibly reduce deaths causes by unexpected drone impacts.

SUMMARY

In one embodiment, a falling drone warning apparatus comprises a structure, a processor, an accelerometer, an audible alarm, and a power source, wherein: the processor, the accelerometer, the audible alarm, and the power source are mechanically coupled to the structure, and the structure is configured to be attached to a drone; the power source supplies electrical power to the processor, the accelerometer, and the audible alarm; the accelerometer is capable of measuring acceleration in three orthogonal axes and is electrically coupled to the processor such that the processor is capable of reading a measured acceleration for each of the three orthogonal axes; the audible alarm is electrically coupled to the processor such that the processor is capable of activating the audible alarm; and the processor activates the audible alarm in a first audible manner based on whether the measured acceleration of one or more of the three orthogonal axes or a combination of the measured acceleration of any two or all of the three orthogonal axes is greater than a first predetermined threshold.

In another embodiment, a falling drone warning apparatus comprises a structure, a processor, an accelerometer, an acoustic sensor, an audible alarm, and a power source, wherein: the processor, the accelerometer, the acoustic sensor, the audible alarm, and the power source are mechanically coupled to the structure, and the structure is configured to be attached to a drone; the power source supplies electrical power to the processor, the accelerometer, the acoustic sensor, and the audible alarm; the accelerometer is capable of measuring acceleration in three orthogonal axes and is electrically coupled to the processor such that the processor is capable of reading a measured acceleration for each of the three orthogonal axes; the acoustic sensor measures one or more sound characteristics of one or more propellers of the drone, and the acoustic sensor is electrically coupled to the processor such that the processor is capable of reading the one or more measured sound characteristics from the acoustic sensor; the audible alarm is electrically coupled to the processor such that the processor is capable of activating the audible alarm; and the processor activates the audible alarm in a first audible manner based on whether the measured acceleration of one or more of the three orthogonal axes or a combination of the measured acceleration of any two or all of the three orthogonal axes is greater than a first predetermined threshold and based on the one or more measured sound characteristics.

In yet another embodiment, a falling drone warning method comprises: attaching a falling drone warning apparatus to a drone, wherein the falling drone apparatus comprises an accelerometer capable of measuring acceleration in three orthogonal axes, an audible alarm, a visual alarm, and a power source, and the power source supplies electrical power to the accelerometer, the audible alarm, and the visual alarm; measuring the acceleration in each of the three orthogonal axes by the accelerometer; and activating the audible alarm in a first audible manner and activating the visual alarm in a first visual manner based on whether the measured acceleration of one or more of the three orthogonal axes or a combination of the measured acceleration of any two or all of the three orthogonal axes is greater than a first predetermined threshold.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference characters and in which:

DETAILED DESCRIPTION

The embodiments described herein generally relate to falling drone warning apparatuses and methods, which may warn people on the ground of a potential impact from a falling or out-of-control drone. Such apparatuses and methods may also allow searchers to locate the fallen drone after it has landed on or crashed to the ground.

Figure 1:
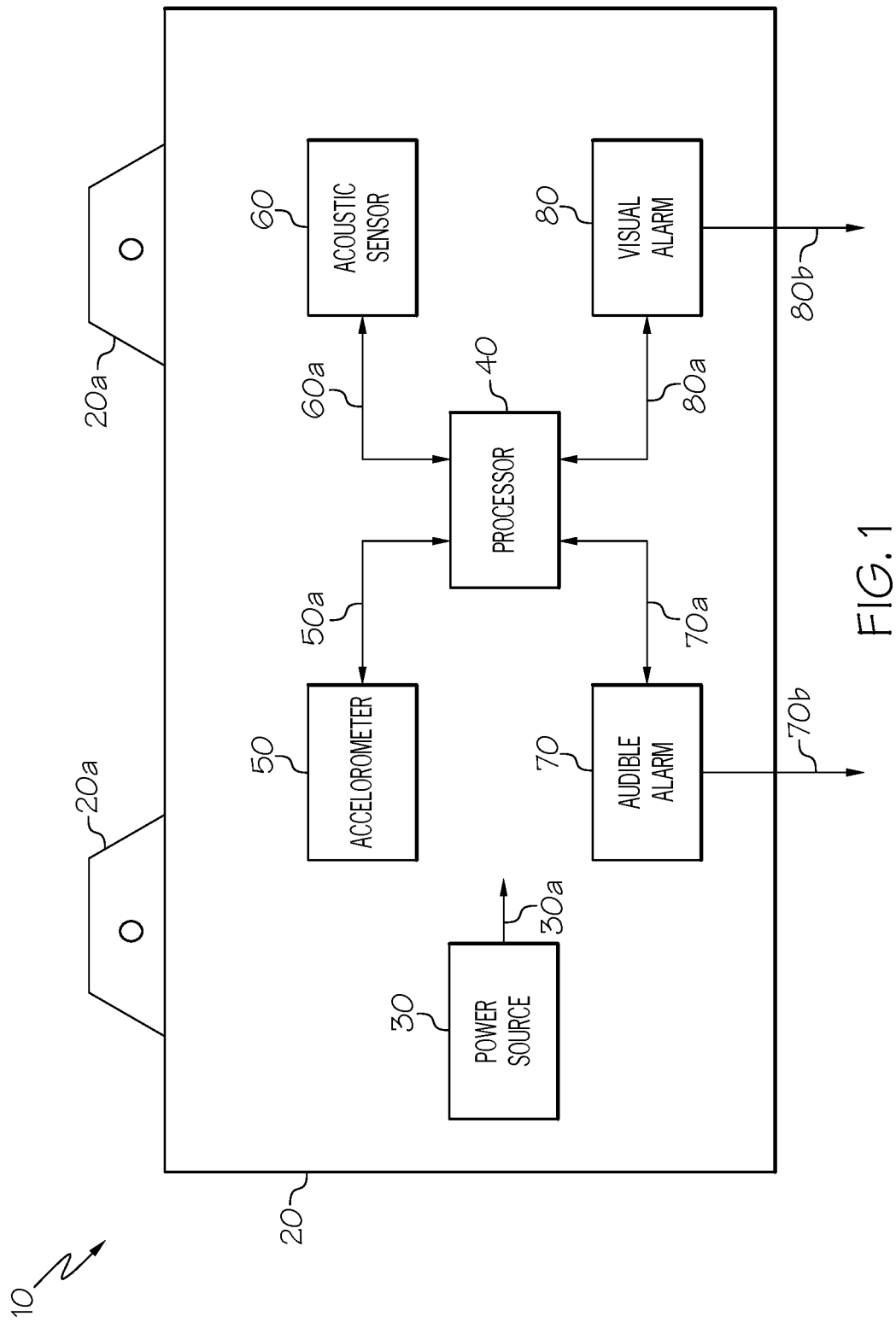
FIG. 1 depicts a drone warning apparatus according to one or more embodiments shown and described herein.

FIG. 1 depicts a falling drone warning apparatus 10 according to one or more embodiments shown and described herein. The apparatus 10 may include a structure 20, power source 30, a processor 40, an accelerometer 50, an acoustic sensor 60, an audible alarm 70, and a visual alarm 80. The power source 30, processor 40, accelerometer 50, acoustic sensor 60, audible alarm 70, and visual alarm 80 may be mechanically coupled to the structure 20. The structure 20 may comprise an enclosure which may be constructed of plastic, carbon fiber, or any other suitable lightweight material which is capable of being physically attached to a drone. The structure 20 may be attached to the outside or inside of a professional, semi-professional (i.e., "prosumer"), or consumer-grade drone in such a fashion to reduce the likelihood that the apparatus 10 impacts the drone's flight characteristics or aerodynamics. The structure 20 may include one or more mounting features 20a which may facilitate the attachment of the apparatus 10 to the drone. The mounting features 20a may include eyelets, holes, hooks, and other similar devices, as is known in the art. In general, the apparatus 10 may be attached to the drone via any suitable means, including cable ties, hooks, screws, and the like.

The power source 30 may supply electrical power to the processor 40, accelerometer 50, acoustic sensor 60, audible alarm 70, and visual alarm 80. For example, the power source 30 may comprise a battery which is capable of suppling sufficient voltage 30a and current to the processor 40, accelerometer 50, acoustic sensor 60, audible alarm 70, and visual alarm 80. In one embodiment, the power source 30 may comprise a coin cell lithium battery, such as a CR1632 battery which has a nominal voltage of 3.0 Volts. Other types of batteries may be used as well. Furthermore, two or more batteries may be used. The battery may be removeably inserted in a battery holder, such as model number 3012TR from Keystone® Electronics, which is designed to accommodate a CR1632 battery which is approximately 16 mm in diameter and 3.2 mm thick. The power source 30 may include voltage regulators, DC/DC converters, and other voltage converters. As such, the power source 30 may be capable of supplying one voltage level to the processor 40, the accelerometer 50, and the acoustic sensor 60, and a different voltage level to the audible alarm 70 and visual alarm 80.

The processor 40 may comprise a microcontroller, including 8-bit, 16-bit, and 32-bit microcontrollers. In one embodiment, the processor 40 comprises an ARM® Cortex® M0+ microcontroller from NXP Semiconductor, model number LPC812M101JTB16X, which has 16 kilobytes of on-chip flash programming memory. The processor 40 may also include RAM, timers, serial interfaces, oscillators, and other peripherals. The on-chip flash programming memory may be designed to execute a program comprising software or firmware instructions. The processor 40 may include a programming interface, such as a Joint Test Action Group (JTAG) interface, which permits a user to load the program into the processor 40.

Continuing to refer to FIG. 1, the accelerometer 50 may be a 3-axis type, which is capable of measuring acceleration in three orthogonal axes, typically called the x-axis, y-axis, and z-axis. These three orthogonal axes may be disposed at right angles to each other so that the accelerometer 50 is capable of measure acceleration in any direction. Because the accelerometer 50 may be mechanically coupled to the structure 20, and the structure 20 may be attached to the drone, the accelerometer 50 may be capable of measuring the acceleration of the drone itself. The accelerometer 50 may be electrically coupled to the processor 40 via electrical signals 50a. The electrical signals 50a may include a serial data bus, such as SPI or I²C. In one embodiment, the electrical signals 50a may include an I²C bus which allows the processor 40 to bi-directionally communicate to the accelerometer 50. The electrical signals 50a may also include a signal (e.g., an interrupt signal) which may inform the processor 40 when the measured acceleration greater than (or less than) a predetermined threshold. As used herein, the term "measured acceleration" includes the measured acceleration of any one or more of the three orthogonal axes or of a combination of the measured acceleration of any two or all three axes; also "a combination" of the measured acceleration of any two or all three orthogonal axes may include the sum of any two axes (e.g., x plus y, y plus z, and/or x plus z) or may include the sum of all three axes. In one embodiment, the accelerometer 50 may comprise model number MMA8652FC from Freescale® Semiconductor; this model is capable of measuring acceleration in the x-, y-, and z-axis and converting the measured acceleration for each axis into a digital number by employing a 12-bit analog-to-digital converter. As such, the processor 40 may be able to read the measured acceleration for each of the three orthogonal axes or a combination thereof.

In one embodiment, the processor 40 may receive a signal from the accelerometer 50 which indicates that the measured acceleration for all axes combined is greater than a first predetermined threshold and/or that the measured acceleration is less than a second predetermined threshold. In this case, the accelerometer 50 itself may perform the task of determining whether the measured acceleration is greater than a first predetermined threshold and, if so, may inform the processor 40 via the signal (e.g., an interrupt signal). In another embodiment, the processor 40 may periodically read the measured acceleration from the accelerometer 50 (e.g., via the SPI or I²C bus), and the processor 40 may determine whether the measured acceleration is greater than a first predetermined threshold. The processor 40 may do this by executing software instructions which compare the measured acceleration with the first predetermined threshold. In any case, the processor 40 may be able to ascertain whether the measured acceleration is greater than a first predetermined threshold or less than a second predetermined threshold.

Because the processor 40 may periodically read the measured acceleration for each of the three orthogonal axes, the processor 40 may also be capable of determining a rate of change of the measured acceleration for each axis. That is, the processor 40 may be able to determine how quickly the acceleration is changing. The processor 40 may determine whether the drone is in a free-fall condition based in part on whether the rate of change of acceleration of one or more of the three orthogonal axes or a combination thereof is greater than a predetermined rate-of-change threshold.

For the purposes of this disclosure, "acceleration" and "measured acceleration" are measured with respect to the earth's acceleration due to gravity, which is approximately 9.8 m/s² (meters per second squared). That is, an object resting on the ground has zero acceleration with respect to gravity. The aforementioned MMA8652FC accelerometer measures absolute acceleration, which includes gravity; thus, it measures 9.8 m/s² when resting on the ground, and it reads close to zero m/s² when in free-fall. Thus, it is to be understood that this disclosure anticipates measuring acceleration in any suitable manner, although the use of "acceleration" and "measured acceleration" herein are defined to be with respect to gravity, unless otherwise stated.

Furthermore, the process of measuring acceleration may include filtering, either by the processor 40 and/or by the accelerometer 50. The filtering may remove or reduce unwanted noise introduced by the measuring process and/or introduced by sudden maneuvers by the drone which could be misinterpreted as the drone going into a free-fall condition. The filtering may be adjusted for a particular type and size of drone. For the purposes of this disclosure, the measured acceleration may or may not include filtering. As an example, the accelerometer 50 may measure acceleration by averaging the most recent eight samples from its analog-to-digital converter. Other types of filtering may be employed, as is known in the art.

The accelerometer 50 may send an interrupt to the processor 40 when a potential free-fall condition is detected. The processor may pull the x-, y-, and z-axis data into its register; and the processor may perform multiple calculations on the combined x-, y-, and z-axis acceleration values over time to determine whether the combined measured acceleration is greater than a predetermined single- or multi-axis threshold, which would be more indicative of a free-fall as opposed to a momentary acrobatic maneuver, such as an intentional acrobatic flip.

The acoustic sensor 60 may be capable of measuring one or more sound characteristics (i.e., frequency and amplitude) of the one or more propellers of the drone. When the drone is flying in a normal, controlled fashion, the rotating propellers (and the air moved by the propellers) may emit a sound having particular frequency and amplitude characteristics. These characteristics may depend on a number of factors, including the shape, size, and number of propellers as well as their operating rotational speed. As such, the frequency and amplitude characteristics may vary between different types of drones. In one embodiment, the expected sound characteristics may be determined by simply permitting the acoustic sensor 60 to record the sound of the one or more propellers when the drone is operating normally.

By measuring the one or more sound characteristics emitted by the one or more propellers of the drone, the acoustic sensor 60 may determine whether the measured frequency and amplitude characteristics are those expected from normally operating propellers. If the measured frequency and amplitude characteristics are close to an expected sound characteristic pattern, then the acoustic sensor 60 may assume a normal operational status of the one or more propellers. Otherwise, the acoustic sensor 60 may assume a failed operational status of the one or more propellers, which may indicate that one of the one or more propellers are either no longer rotating or are rotating at speed insufficient to prevent the drone from free falling. When this occurs, the drone may be entering into a free-fall condition. The acoustic sensor 60 may be electrically coupled to the processor 40 via electrical signals 60a, which may include a serial data bus, such as SPI or I²C.

The measured acceleration and the measured sound characteristics of the one or more propellers may be combined in order to determine whether the drone is in a free-fall condition. Regarding the acceleration, the processor 40 may ascertain whether the measured acceleration is greater than the first predetermined threshold, and the processor 40 may combine this with how closely the sound characteristics match to an expected sound characteristic pattern. In one embodiment, the processor 40 may weight the measured acceleration by 70% and the sound characteristics by 30% in order to determine whether the drone is in free-fall condition. Other percentages may be used as well. In one embodiment, the processor 40 may weight the measured acceleration by determining how close it is to the threshold (above or below).

The audible alarm 70 may be capable of emitting a sound 70b when activated such that the sound 70b may be capable of attracting the attention of people on the ground. The audible alarm 70 may be electrically coupled to the processor 40 via electrical signals 70a such that the processor 40 is capable of activating the audible alarm 70. The audible alarm 70 may include an amplifier (e.g., an operational amplifier) in order to allow the processor 40 to efficiently drive the audible alarm 70. In one embodiment, the audible alarm 70 may be model number PKLCS1212E24AO-R1 from Murata Electronics; models from other suppliers may be used as well.

The audible alarm 70 may be activated in a number of audible manners in which the frequency, amplitude, and other characteristics of the sound 70b may be defined. In one embodiment, the audible alarm 70 may be activated in a first audible manner which the sound 70b may be similar to a siren emitted by a typical police car or ambulance. For example, activating the audible alarm 70 in the first audible manner may cause it to generate a sound 70b which rapidly alternates between two frequencies. Such a type of sound 70b may attract the attention of people on the ground and may audibly warn them of an impending impact from a falling drone. In another embodiment, the audible alarm 70 may be activated in a second audible manner in which the sound 70b may comprise a periodic "chirp" at a fixed rate (e.g., one second). Such a type of sound 70b may assist searchers looking for the drone after it has crashed to the ground. Other audible manners of activating the audible alarm 70 are anticipated.

The visual alarm 80 may be capable of emitting visible light 80b when activated such that the visible light 80b may attract the attention of people on the ground, which may permit them to ascertain the location and trajectory of the falling drone and to take appropriate action. The visual alarm 80 may be electrically coupled to the processor 40 via electrical signals 80a such that the processor 40 is capable of activating the visual alarm 80. The visual alarm 80 may include an amplifier or a driver circuit in order to allow the processor 40 to efficiently drive the visual alarm 80. In one embodiment, the visual alarm 80 may comprise one or more light-emitting diodes (LEDs); other types of light-emitting devices may be used as well. In one embodiment, the visual alarm 80 may include one or more LEDs, model number APT1608SURCK or APT1608SGC from Kingbright.

Similar to the audible alarm 70, the visual alarm 80 may be activated in a number of visual manners in which the frequency and other characteristics of the visible light 80b may be defined. In one embodiment, the visual alarm 80 may be activated in a first visual manner in which a bright, white light is rapidly turned on and off. For example, activating the visual alarm 80 in the first visual manner may cause it to generate a bright, white light which turns off and on at a rate of 500 milliseconds. Such a visible light 80b may attract the attention of people on the ground and may also permit them to ascertain the location and trajectory of the falling drone and to take appropriate action. In another embodiment, the visual alarm 80 may be activated in a second visual manner in which the visible light 80b comprises a periodic "flicker" at a fixed rate (e.g., one second). Such a visible light 80b may assist searchers looking for the drone after it has crashed to the ground. Other visual manners of activating the visual alarm 80 are anticipated.

The power source 30, processor 40, accelerometer 50, acoustic sensor 60, audible alarm 70, and visual alarm 80 do not necessarily have to be directly affixed to the structure 20 in order to be mechanically coupled thereto. For example, the processor 40, accelerometer 50, acoustic sensor 60, and audible alarm 70 may be mounted on a printed circuit board (PCB), which may be affixed to the structure 20. Other means of mechanically coupling these components to the structure 20 are contemplated as well.

Regarding the predetermined thresholds, the first predetermined threshold and the second predetermined threshold may be based on the size and type of drone. For example, the first predetermined threshold may be set to 9.0 m/s$^2$. That is, the processor 40 may ascertain that the drone is entering a free-fall condition if the measured acceleration is greater than 9.0 m/s$^2$, and it may activate the audible alarm 70 in a first audible manner and the visual alarm 80 in a first visual manner. As another example, the second predetermined threshold may be set to 0.1 m/s$^2$. That is, the processor 40 may ascertain that the drone has landed on or crashed to the ground if, after the processor 40 has ascertained that the drone is in a free-fall condition, the measured acceleration is less than 0.1 m/s$^2$. In this case, the processor 40 may activate the audible alarm 70 in a second audible manner and activate the visual alarm 80 in a second visual manner.

Figure 2:
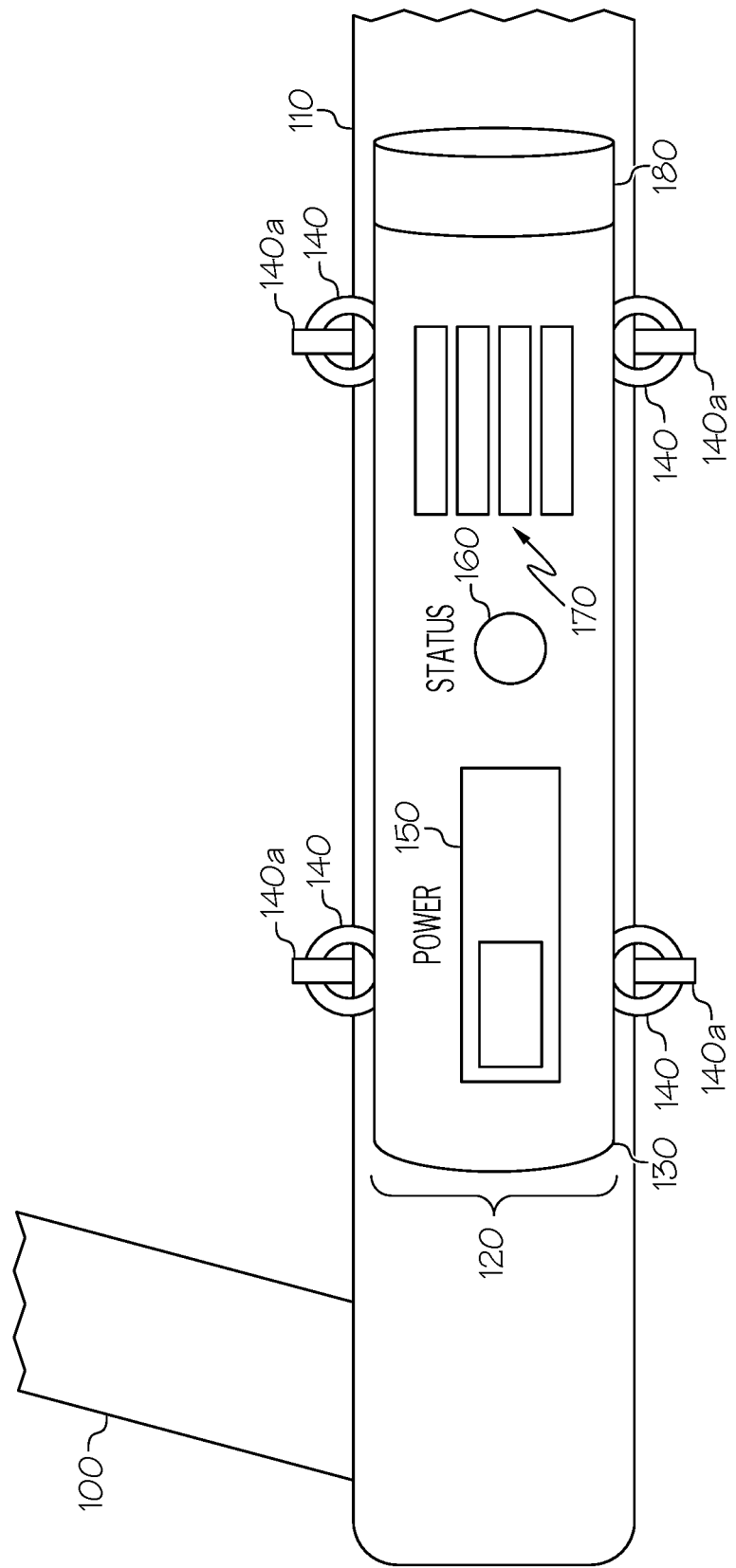
FIG. 2 illustrates a drone warning apparatus affixed to a drone according to one or more embodiments shown and described herein.

In FIG. 2, a portion of a drone is shown to which the falling drone warning apparatus 120 may be attached. In this figure, the portion of the drone shown includes a drone landing support 100 and a drone landing leg 110. It is anticipated that the apparatus 120 may be attached to other parts of the drone. In one embodiment, a falling drone warning apparatus 120 may comprise a structure 130 which may comprise an enclosure as shown. The structure 130 may have one or more mounting features 140 to facilitate the attachment of the apparatus 120 to the drone. The mounting features 140 may accommodate mounting screws, washers and nuts, cable ties, or other attachment means. In this embodiment, the apparatus 120 may be attached to the drone landing leg 110 via cable ties 140a. The apparatus 120 may also include a power switch 150 which may allow the user to turn the apparatus 120 on and off as needed. The apparatus 120 may include a status indicator 160 which may indicate an operating status of the apparatus 120. For example, the status indicator 160 may indicate that the apparatus 120 is turned on and is operating normally. The apparatus 120 may further include one or more openings 170 to permit the noise generated by the audible alarm to transfer to the outside of the enclosure more efficiently, thus reducing the potential sound attenuation from the enclosure itself. The openings 170 may include holes, slots, and so forth. Finally, the apparatus 120 may also comprise a battery compartment 180 which may facilitate the installation and removed of a battery or other power source.

Figure 3:
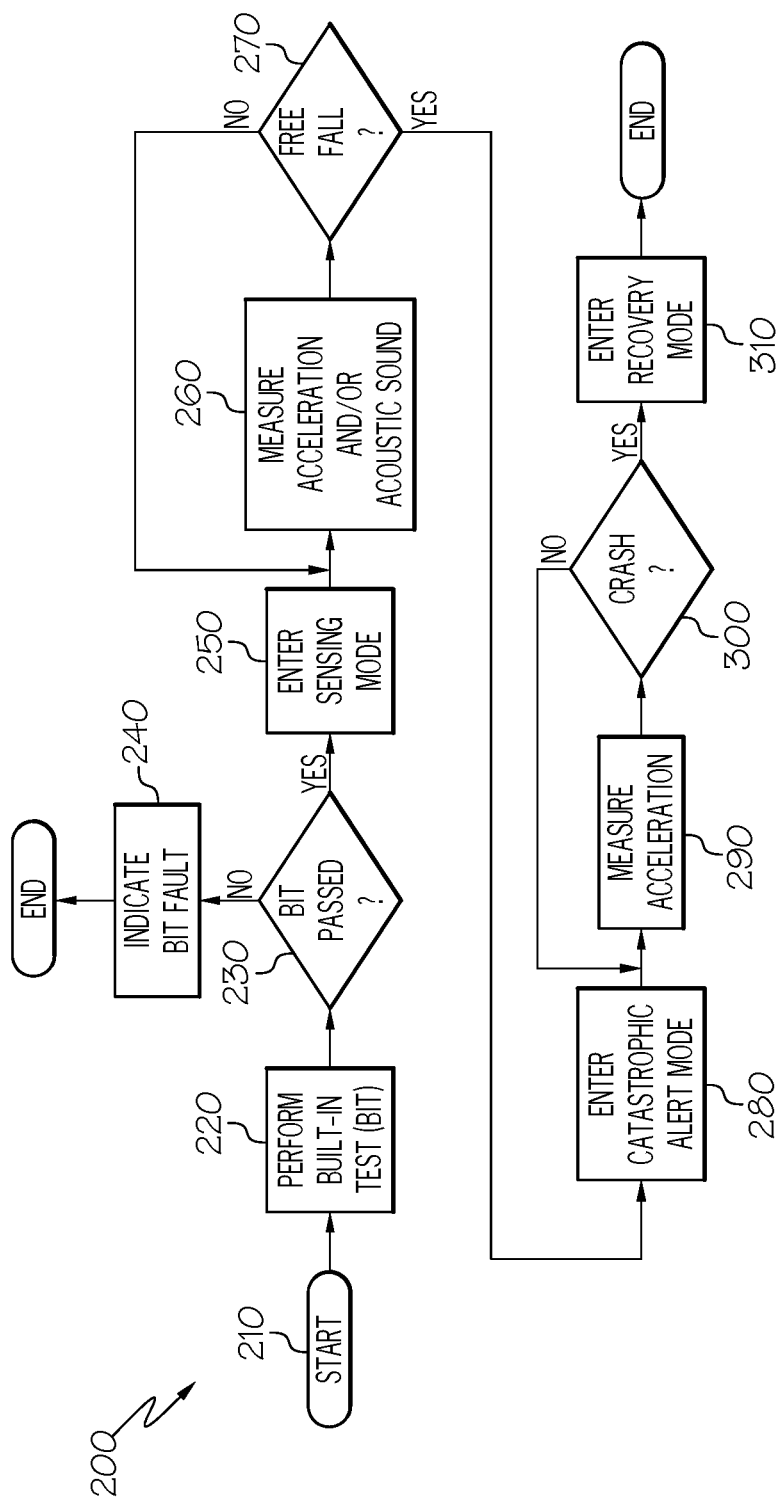
FIG. 3 shows a method for warning of a falling drone according to one or more embodiments shown and described herein.

FIG. 3 illustrates a flow chart 200 of the operation of the falling drone warning apparatus. The process starts at step 210 when the apparatus is turned on. The next step 220 is a built-in test (BIT), wherein the apparatus performs a self-test to determine whether the circuitry is fully operable. At step 230, the status of the BIT is determined. If the BIT passes, the process moves to step 250; if the BIT fails, the process moves to step 240 where a BIT fault is indicated (e.g., by a status indicator). At step 250, the process enters "sensing mode." At step 260, the process determines whether the measured acceleration exceeds a first predetermined threshold and/or reads the one or more sound characteristics from the acoustic sensor. At step 270, the process determines whether the drone is in free-fall in the x-, y-, and/or z-axis based on whether the measured acceleration of any of these axes or combination thereof exceeds a first predetermined threshold and/or based on the one or more sound characteristics from the acoustic sensor. At step 270, when the process determines that the drone is in a free-fall condition, the process moves to step 280, where the process enters "catastrophic alert mode." If, at step 270, the process determines that the drone not in a free-fall condition, the process moved back to step 260.

At step 280, the method activates the audible alarm and the visual alarm. The audible alarm may be activated in a first audible manner in which the audible alarm may produce a noise that is similar to a siren. The visual alarm may be activated in a first visual manner in which the visual alarm flashed visible light at a fixed frequency. The audible alarm and visual alarm continue to be activated in this manner when the process moves to step 290, in which the process ascertains whether the measured acceleration of one or more of the three orthogonal axes or combination thereof is less than a second predetermined threshold. At step 300, if the measured acceleration is less than a second predetermined threshold, the processor determines that the drone has crashed, at which time, the process moves on to step 310. At step 300, if the process ascertains that the measured acceleration is greater than or equal to a second predetermined threshold, the process moves back to step 290 and the process repeats. At step 310, the process enters "recovery mode," in which the process may provide a unique indication through the audible alarm and/or the visual alarm. In this mode, the operation of the audible alarm and/or the visual alarm may be different than in "catastrophic alert mode." For example, in this mode, the audible alarm may be activated in a second audible manner, and the visual alarm may be activated in a second visual manner. For example, the audible alarm activated in the second audible manner may emit a noise at an intermittent fashion; and the visual alarm activated in the second visual manner may flash at a slower frequency.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A falling drone warning apparatus comprising a structure, a processor, an accelerometer, an audible alarm, and a power source, wherein:
   the processor, the accelerometer, the audible alarm, and the power source are mechanically coupled to the structure, and the structure is configured to be attached to a drone;
   the power source supplies electrical power to the processor, the accelerometer, and the audible alarm;
   the accelerometer is capable of measuring acceleration in three orthogonal axes and is electrically coupled to the processor such that the processor is capable of reading a measured acceleration for each of the three orthogonal axes;
   the audible alarm is electrically coupled to the processor such that the processor is capable of activating the audible alarm; and
   the processor activates the audible alarm in a first audible manner based on whether the measured acceleration of one or more of the three orthogonal axes or a combination of the measured acceleration of any two or all of the three orthogonal axes is greater than a first predetermined threshold.

2. The apparatus of claim 1, wherein the structure comprises an enclosure, and the processor, the accelerometer, the audible alarm, and the power source are disposed inside the enclosure.

3. The apparatus of claim 1, wherein the processor is a 32-bit microcontroller.

4. The apparatus of claim 1, wherein the power source is a battery.

5. The apparatus of claim 1, wherein:
   the processor is capable of determining a rate of change of the measured acceleration for each of the three orthogonal axes; and
   the processor activates the audible alarm in the first audible manner further based on whether the rate of change of the measured acceleration of one or more of the three orthogonal axes or a combination of the rate of change of the measured acceleration of any two or all of the three orthogonal axes is greater than a predetermined rate-of-change threshold.

6. The apparatus of claim 1, wherein, after the audible alarm has been activated in the first audible manner, the processor activates the audible alarm in a second audible manner based on whether the measured acceleration of one or more of the three orthogonal axes or a combination of the measured acceleration of any two or all of the three orthogonal axes is less than a second predetermined threshold.

7. The apparatus of claim 1 further comprising a visual alarm, wherein:
   the visual alarm is mechanically coupled to the structure;
   the power source supplies electrical power to the visual alarm;
   the visual alarm is electrically coupled to the processor such that the processor is capable of activating the visual alarm; and
   the processor activates the visual alarm in a first visual manner when the processor activates the audible alarm in the first audible manner.

8. The apparatus of claim 7, wherein, after the audible alarm has been activated in the first audible manner, the processor activates the audible alarm in a second audible manner and activates the visual alarm in a second visual manner based on whether the measured acceleration of one or more of the three orthogonal axes or a combination of the measured acceleration of any two or all of the three orthogonal axes is less than a second predetermined threshold.

9. The apparatus of claim 7, wherein the visual alarm comprises one or more light-emitting diodes (LEDs).

10. A falling drone warning apparatus comprising a structure, a processor, an accelerometer, an acoustic sensor, an audible alarm, and a power source, wherein:
    the processor, the accelerometer, the acoustic sensor, the audible alarm, and the power source are mechanically coupled to the structure, and the structure is configured to be attached to a drone;
    the power source supplies electrical power to the processor, the accelerometer, the acoustic sensor, and the audible alarm;
    the accelerometer is capable of measuring acceleration in three orthogonal axes and is electrically coupled to the processor such that the processor is capable of reading a measured acceleration for each of the three orthogonal axes;

the acoustic sensor measures one or more sound characteristics of one or more propellers of the drone, and the acoustic sensor is electrically coupled to the processor such that the processor is capable of reading the one or more measured sound characteristics from the acoustic sensor;

the audible alarm is electrically coupled to the processor such that the processor is capable of activating the audible alarm; and the processor activates the audible alarm in a first audible manner based on whether the measured acceleration of one or more of the three orthogonal axes or a combination of the measured acceleration of any two or all of the three orthogonal axes is greater than a first predetermined threshold and based on the one or more measured sound characteristics.

11. The apparatus of claim 10, wherein the structure comprises an enclosure, and the processor, the accelerometer, the audible alarm, the acoustic sensor, and the power source are disposed inside the enclosure.

12. The apparatus of claim 10, wherein the processor is a 32-bit microcontroller.

13. The apparatus of claim 10, wherein the power source is a battery.

14. The apparatus of claim 10, wherein the processor activates the audible alarm in the first audible manner based 70% on whether the measured acceleration of one or more of the three orthogonal axes or a combination of the measured acceleration of any two or all of the three orthogonal axes is greater than the first predetermined threshold and based 30% on the one or more measured sound characteristics.

15. The apparatus of claim 10, wherein, after the audible alarm has been activated in the first audible manner, the processor activates the audible alarm in a second audible manner based on whether the measured acceleration of one or more of the three orthogonal axes or a combination of the measured acceleration of any two or all of the three orthogonal axes is less than a second predetermined threshold.

16. The apparatus of claim 10 further comprising a visual alarm, wherein:

the visual alarm is mechanically coupled to the structure;

the power source supplies electrical power to the visual alarm;

the visual alarm is electrically coupled to the processor such that the processor is capable of activating the visual alarm; and the processor activates the visual alarm in a first visual manner when the processor activates the audible alarm in the first audible manner.

17. The apparatus of claim 16, wherein, after the audible alarm has been activated in the first audible manner, the processor activates the audible alarm in a second audible manner and activates the visual alarm in a second visual manner based on whether the measured acceleration of one or more of the three orthogonal axes or a combination of the measured acceleration of any two or all of the three orthogonal axes is less than a second predetermined threshold.

18. The apparatus of claim 16, wherein the visual alarm comprises one or more light-emitting diodes (LEDs).

19. A falling drone warning method comprising:

attaching a falling drone warning apparatus to a drone, wherein the falling drone apparatus comprises an accelerometer capable of measuring acceleration in three orthogonal axes, an audible alarm, a visual alarm, and a power source, and the power source supplies electrical power to the accelerometer, the audible alarm, and the visual alarm;

measuring the acceleration in each of the three orthogonal axes by the accelerometer; and activating the audible alarm in a first audible manner and activating the visual alarm in a first visual manner based on whether the measured acceleration of one or more of the three orthogonal axes or a combination of the measured acceleration of any two or all of the three orthogonal axes is greater than a first predetermined threshold.

20. The method of claim 19, further comprising:

measuring the acceleration in three orthogonal axes by the accelerometer after activating the visual alarm in the first visual manner and after activating the visual alarm in the first visual manner; and activating the audible alarm in a second audible manner and activating the visual alarm in a second visual manner based on whether the measured acceleration of one or more of the three orthogonal axes or a combination of the measured acceleration of any two or all of the three orthogonal axes is less than a second predetermined threshold.

* * * * *